S. F. BRIGGS.
REGULATOR.
APPLICATION FILED APR. 17, 1916.
1,399,741.
Patented Dec. 13, 1921.
2 SHEETS—SHEET 1.
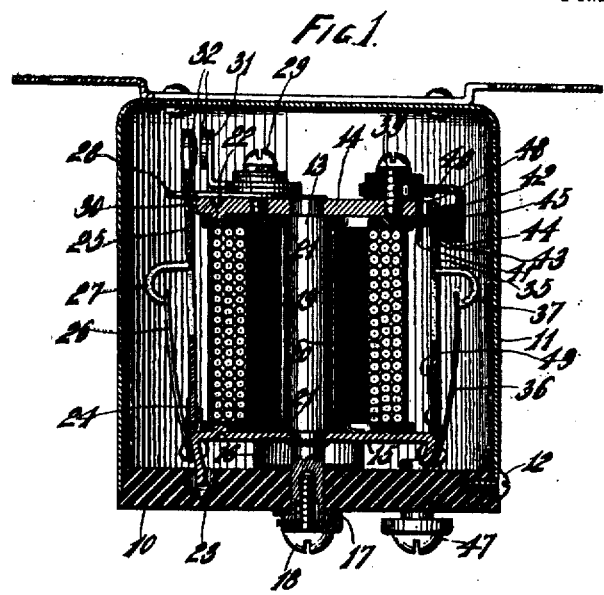
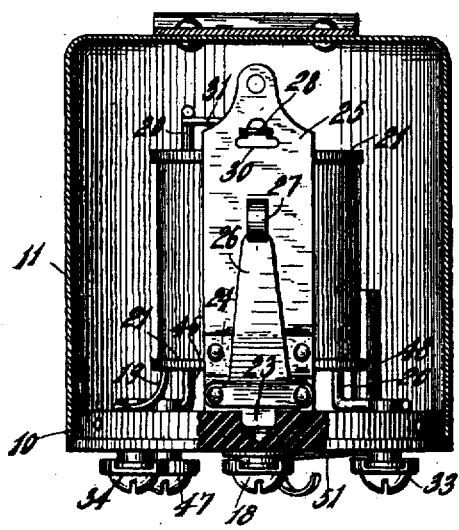
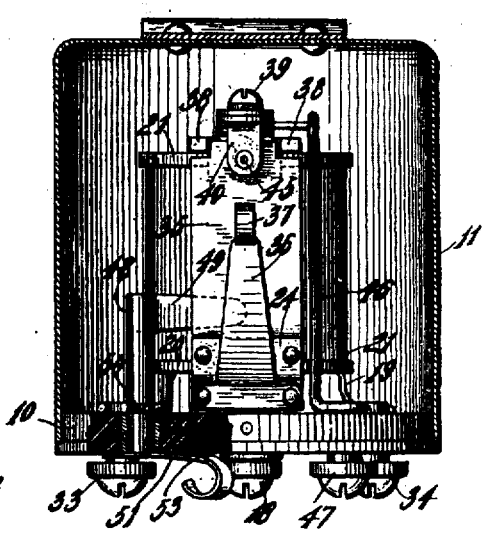
WITNESSES.
INVENTOR.

S. F. BRIGGS.
REGULATOR.
APPLICATION FILED APR. 17, 1916.
1,399,741.
Patented Dec. 13, 1921.
2 SHEETS—SHEET 2.
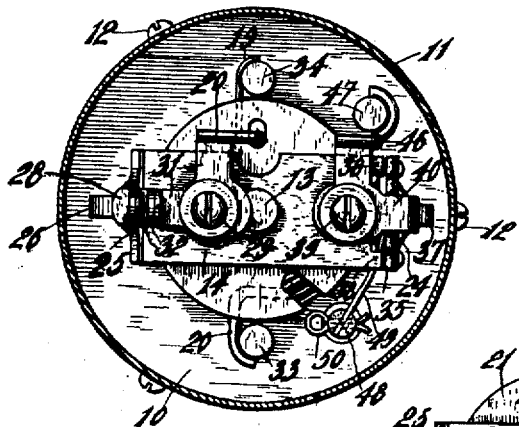
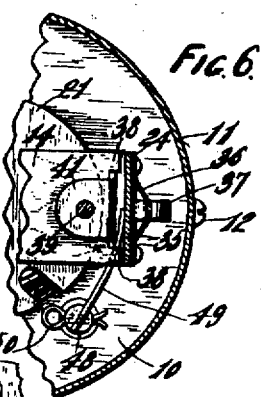
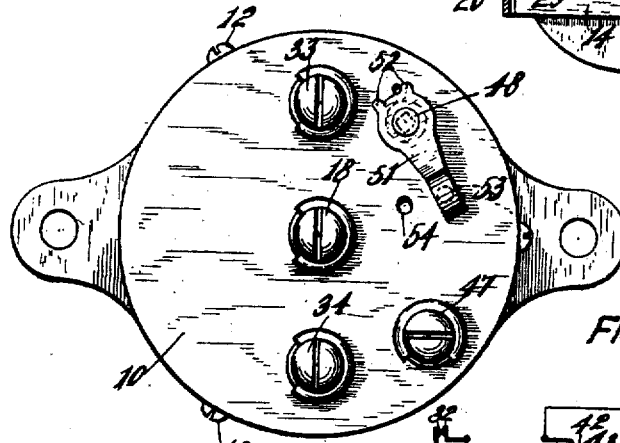
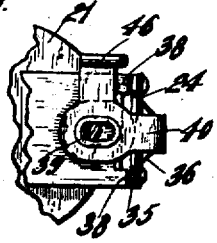
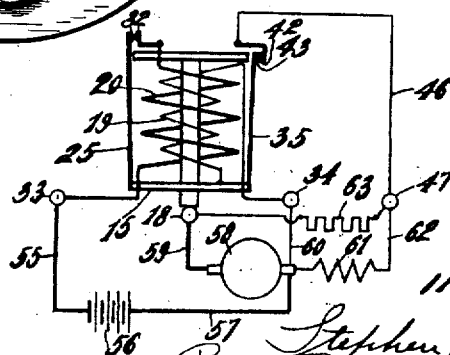
WITNESSES.
INVENTOR.
Stephen F. Briggs
By R. S. Caldwell
ATTORNEY.

UNITED STATES PATENT OFFICE.

STEPHEN F. BRIGGS, OF MILWAUKEE, WISCONSIN, ASSIGNOR TO BRIGGS & STRATTON COMPANY, OF MILWAUKEE, WISCONSIN, A CORPORATION OF WISCONSIN.

REGULATOR.

1,399,741. Specification of Letters Patent. Patented Dec. 13, 1921.

Application filed April 17, 1916. Serial No. 91,550.

*To all whom it may concern:*

Be it known that I, STEPHEN F. BRIGGS, a citizen of the United States, and resident of Milwaukee, in the county of Milwaukee and State of Wisconsin, have invented new and useful Improvements in Regulators, of which the following is a description, reference being had to the accompanying drawings, which are a part of this specification.

This invention has for its object to provide a regulator for maintaining an approximately constant flow of current through a storage battery charging circuit supplied by a generator operating under widely varying speeds, as in the case of a generator driven by the gas engine of an automobile.

The invention relates to that class of regulators for this purpose known as vibrating regulators, in which an electromagnet influenced by shunt and series windings operates a voltage regulating armature and a vibrating generator output regulating armature, the voltage regulating armature to maintain the storage battery charging circuit only during the development of a predetermined voltage or greater voltage by the generator, and the generator output regulating armature to maintain an approximately constant current flow through the charging circuit.

The object of the present invention is to perfect details of construction of such vibrating regulators and to provide for varying the rate of charge of the storage battery. Another object of the invention is to simplify the construction to render it inexpensive to manufacture.

With the above and other objects in view the invention consists in the regulator as herein claimed and all equivalents.

Referring to the accompanying drawings, in which like characters of reference indicate the same parts in the different views.

Figure 1 is a central sectional view of a regulator constructed in accordance with this invention;

Fig. 2 is a side view thereof with parts in section as seen from the voltage regulator side;

Fig. 3 is a similar view as seen from the current regulator side;

Fig. 4 is a top view thereof;

Fig. 5 is a bottom view;

Fig. 6 is a detail view showing the engagement of the charge-boosting spring with the armature of the current regulator;

Fig. 7 is a detail view showing the arrangement by which the contact brackets may be adjusted.

Fig. 8 is a detail view of the stop plate for the voltage regulator armature; and, Fig. 9 is a diagram of the wiring connections.

In these drawings 10 indicates a disk-line base of insulating material fitting within a cup-shaped sheet metal cover 11 which is suitably secured thereto and provided with means for attachment to a support. A shouldered magnet core 13, with top and bottom pole pieces 14 and 15 respectively riveted thereon against its opposite shoulders, passes through an opening in the base 10, with a cup-shaped spacer 16 surrounding it and spacing the pole piece 15 from the base, while the end of the core is turned over as a rivet upon a washer 17 and has a screw threaded therein forming a binding post 18. Upon the magnet core 13 between the pole pieces 14 and 15 are magnet windings 19 and 20, the former being of fine wire forming a shunt coil, and the latter of coarse wire forming a series coil. Between the magnet windings and the pole pieces 14 and 15 are disks or washers 21 of insulating material, and through an opening in one of them the shunt coil 19 has one end grounded on the pole piece 15. Other openings in the insulating washers 21 near their edges are for receiving lugs 22 which are struck up from the pole pieces 14 and 15 to prevent parts from turning, the pole piece 15 being anchored to the base 10 by having a lug 23 on one of its downwardly bent ends entering a pocket or recess formed in said base 10. Riveted to one of the downwardly bent ends of pole piece 15 is a thin sheet metal piece 24 to which an iron plate 25 is riveted, the piece 24 being sufficiently flexible and of suitable material, such as spring brass, to constitute a hinge for the plate 25, which extending from near one pole piece past the end of the other pole piece constitutes the armature for the voltage regulator. A spring 26 which is riveted to the downwardly bent end of the pole piece 15, together with the hinge plate 24, has its end engaged by a hook-shaped tongue 27 cut from the armature 25. The tongue 27 is so bent as to engage the end of the spring and hold the same out of its natural position, whereby a spring action is given to the armature tending to hold it away from the end of pole piece 15, and the degree of this spring action may be varied by slightly bending the tongue more or less which may readily be done by the aid of pliers. To limit the movement of the armature 25 away from the pole piece 14 an armature stop 28 is secured to the pole piece 14 by means of a screw 29, said armature stop consisting of a metal plate, as shown in Fig. 8, with notches on opposite sides to form a contracted neck portion connecting a head end to a body end. The head end of the plate is passed through a T-shaped opening 30 in armature 25, and the neck portion of the armature stop lies within the contracted portion of the opening so that the head portion will engage the armature to limit its outward movement. An angular contact bracket 31 is secured in place by means of the screw 29, before referred to, with suitable insulation between it and adjacent parts that will, however, permit of the adjustment of the contact bracket toward or away from the armature 25. Contacts 32 on the contact bracket 31 and the armature 25 respectively are engaged when the armature is attracted by the magnet. One end of the series winding 20 is connected with the contact bracket 31, while the other end thereof connects with a binding post 33 on the base 10. The end of the shunt winding 19 which is not grounded on the pole piece 15 is connected with a binding post 34 on the base 10.

A generator output regulating armature 35 and its spring 36 are mounted on the other downwardly bent end of pole piece 15, in the same manner as with armature 25 and spring 26 and have the same relation to each other, the hook 37 serving to adjust the spring pressure with which the armature is held away from the end of pole piece 14. The upper end of the armature 35, however, is somewhat different from the other armature inasmuch as it is recessed at its corners so as to fit between projecting horns 38 at the corners of pole piece 14 formed by cutting away the central portion of the end thereof. This enables the armature 35 to swing between projecting portions of the pole piece for the purpose of diminishing the attractive force of the magnet toward the end of the movement of the armature toward the pole piece. At this end of the pole piece 14 there is a clamping screw 39 securing in place an adjustable, insulated contact bracket 40 and an angularly bent armature stop 41. The contact bracket 40 is bent downwardly and has a contact member 42 coöperating with a contact member 43 on the armature 35, there being an intermediate loose contact member 44 positioned between the other contact members and loosely mounted on a pin 45 of wood or other non-conducting material which is fitted in the contact 42 and in the armature stop 41 and loosely passes through the contact members 44 and 43. The object of this loose intermediate contact member is to afford a changing contact surface and avoid pitting of the contacts. A wire 46 connects the contact bracket 40 with a binding post 47 on the base.

A rod 48 passes through a metal bushing in the base and has a spring arm 49 secured to its upper end and bearing against the inner face of the current regulator armature 35 in one position of the rod. A cotter pin 50 passes through the rod 48 and bears on one end of the bushing, while a handle member 51 of spring metal is secured to the outer end of the rod and bears on the other end of the bushing, thus confining the rod in place though permitting it to be turned by means of the handle for applying the pressure of the spring 49 against the current regulator armature 35. The movements of the handle 51 are limited by suitable stops 52 and the handle is held in its positions by means of a projection 53 thereon engaging suitable notches or recesses 54 in the base 10.

In connecting up the regulator of this invention binding post 33 is connected by a wire 55 with one terminal of a storage battery 56, and a wire 57 connects the other terminal of the storage battery with one brush of the armature 58 of the generator, the other brush of which is connected by a wire 59 with binding post 18. Binding post 34 is connected by a wire 60 with the end of the shunt field winding 61 of the generator which is connected to the brush of the armature, while a wire 62 connects the other end of the shunt field winding 61 with binding post 47. A suitable resistance element 63 may be connected between binding posts 18 and 47.

In operation the shunt winding 19 which is connected across the terminals of the generator controls the operation of the voltage regulator switch contacts 32 by closing the same only when the generator voltage is above a predetermined minimum. This permanently closed circuit through the shunt field winding of the magnet may be traced on the diagram as follows: From the generator armature 58 through wire 59 to binding post 18 on magnet core, through shunt magnet winding 19 and wire 16 to binding post 34, and back to generator armature 58 by way of wire 60. The closing of the switch contacts 32 completes a charging circuit through the storage battery with the magnet winding 20 in series therewith. This circuit is from generator armature 58 through wire 59 to binding post 18 on magnet core through pole piece 15, armature 25, closed contacts 32, series magnet winding 20, binding post 33, wire 55, storage battery 56 and wire 57 to generator armature. It will thus be seen that on starting the engine or other driving means for the generator the storage battery 56 is not included in circuit therewith until the generator has acquired sufficient speed to bring its voltage to that required for charging the storage battery, at which point the strength of the magnet, due to the excitation of the shunt magnet winding 19, is sufficient to overcome the spring action on armature 25, causing said armature to swing and close the contacts 32. The closing of the switch contacts 32 not only connects the storage battery with the generator so as to receive the charge therefrom, but the series magnet winding 20 included in the charging circuit assists the shunt magnet winding in holding the contacts 32 closed. The charging circuit is therefore controlled by a compound wound magnet, the shunt winding 19 of which is influenced by the variations in voltage of the charging circuit, while the series winding 20 is influenced by the variations in current flow through the charging circuit. The spring action of the current regulator armature 35 is sufficient to resist the attractive effort of the electromagnet during the normal conditions of the charging circuit but is overcome by the increased pull of the magnet when the predetermined normal current strength in the charging circuit is exceeded. Thus when the speed of the generator is excessive and its voltage goes above the predetermined maximum for which the regulator has been adjusted the increase in the flow of current through the series winding 20 causes the electromagnet to attract its armature 35 so as to break the connection made by the engaged contacts 42, 43 and 44. This has the effect of introducing a regulating resistance in the shunt field circuit of the generator, thus reducing the strength of the generator field and consequently diminishing the output of the generator armature. This effect is instantaneous so that the opening of the current regulator contacts to reduce the flow of current in the charging circuit is immediately followed by their closing again because of the resulting weakening of the electromagnet, and consequently the action of the current regulating armature is a rapid vibration tending to maintain the current strength of the charging circuit constant under variations in speed of the generator. The generator shunt field circuit, when the current regulating contacts are closed, is from generator armature 58 through wire 59, binding post 18 on the magnet core, pole piece 15, armature 35, closed contacts 43, 44 and 42, wire 46, binding post 47, wire 62 and shunt field winding 61 back to generator armature. The opening of the current regulator contacts merely serves to include in the shunt field circuit the resistance 63, the circuit then being from generator armature 58, wire 59, binding post 18, resistance 63, binding post 47, wire 62 and shunt field winding 61 back to generator armature. The voltage regulating armature 25 will be released by the electromagnet to open the battery charging circuit whenever the speed of the generator is reduced to a point where its voltage is less than the voltage of the storage battery, for at such times the storage battery discharges back through the generator and through the respective windings of the electromagnet and in a direction to oppose one winding to the other instead of having one supplement the other as before, thus neutralizing their effect and causing the switch contacts 32 to immediately open. This back discharge circuit may be traced from storage battery 56 through wire 55, binding post 33, series magnet winding 20, closed contacts 32, armature 25 to pole piece 15 where it divides, one branch passing through binding post 18, wire 59, generator armature 58 and wire 57 back to battery, and the other branch passing through shunt magnet winding 19, binding post 34, wire 60 and wire 57 back to battery. While the direction of the current flow through the shunt magnet winding 19 is the same as before, the direction of current flow through the series magnet winding 20 is reversed.

The action of spring 26 on the voltage regulator armature 25 may be readily varied to adjust the regulator so that it will be sensitive to the predetermined minimum voltage. Such adjustment is made by bending the hook 27 forming the spring stop. By bending this hook more or less by means of suitable pliers the spring action on the armature 25 may be increased or diminished with a corresponding change in the voltage to which the voltage regulator will respond. Likewise suitable adjustment may be made in the normal action of the spring 36 of the current regulator to change the charging rate. At certain seasons the storage battery of automobiles is subjected to greater use than at other seasons and it is desirable to increase the rate of charge during the active seasons. In order that this may be done without necessitating the opening of the casing and without disturbing the spring adjustment the auxiliary spring 49 is provided, which on being turned by the handle 51 to a position where it bears against the current regulating armature 35 gives additional pressure tending to hold the contacts closed, and consequently requires a greater current flow through the charging circuit including the series winding 20 before the armature will respond to separate the contacts and introduce the regulating resistance in the shunt field circuit of the generator.

The auxiliary spring 49 thus constitutes a "charge booster" for temporary use, and, when it is thrown out of action by returning the handle 51 to its original position, the normal charging rate is reëstablished as the careful adjustment of the spring 36 has not been altered during its use.

The entire device is simple in its construction, making it inexpensive to manufacture though it is strong and durable and efficient in its operation.

What I claim as new and desire to secure by Letters Patent is:

1. In a vibrating regulator for controlling the charging of storage batteries from variable speed generators, a vibrating armature for generator-output regulation, means for giving a normal spring action to said armature, and an auxiliary charge boosting spring for varying the spring action of said armature without affecting the adjustment of the normal spring action thereof.

2. In a vibrating regulator for charging storage batteries from variable speed generators, a vibrating armature for generator output regulation, means for giving a normal spring action to said armature, and an auxiliary charge boosting spring for varying the spring action of the armature and adapted to be brought into and out of operative relation therewith without affecting the adjustment of the normal spring action thereof.

3. In a vibrating regulator for controlling the charging of storage batteries from variable speed generators, an electromagnet having a vibrating armature for generator output regulation, adjustable means for giving spring action to the armature, and auxiliary charge boosting spring means movable into and out of operative relation with the armature for varying the spring action thereof without affecting the adjustment of the normal spring action thereof.

4. In a vibrating regulator for controlling the charging of storage batteries from variable speed generators, an electromagnet having a vibrating armature for generator output regulation, means for giving a normal spring action to the armature, a casing inclosing the electromagnet and its armature, and charge boosting spring means operated from the exterior of the casing for giving supplemental spring action to the armature without affecting the adjustment of the normal spring action thereof.

5. In a vibrating regulator for controlling the charging of storage batteries from variable speed generators, an electromagnet having a vibrating armature for generator output regulation, means for giving a normal spring action to the armature, a casing inclosing the electromagnet and its armature, and change boosting spring means operated from the exterior of the casing for giving supplemental spring action to the armature without affecting the adjustment of the normal spring action thereof.

6. In a regulator, an insulating base, an electromagnet mounted thereon, a vibrating armature therefor for generator output regulation, a spring for said armature, a rod rotatably mounted in the base, a spring carried thereby and adapted to bear on the armature, and a handle on the rod provided with a detent for holding it in its different positions.

7. In a regulator, an electromagnet having a pole piece with an armature pivotally mounted thereon, a spring member secured to the pole piece, and a bendable projection on the armature engaging the spring for causing the spring to give variable spring action to the armature without disturbing its other adjustments.

8. In a regulator, an electromagnet having a pole piece with its end bent at an angle thereto, a strip of flexible metal and a spring riveted to the bent end of the pole piece, and an armature secured to the strip of flexible metal and having a tongue cut therefrom and bent up to form an adjustable hook engaging the spring.

9. In a regulator, an electromagnet, a suitably mounted armature therefor having an opening and an armature stop secured to one of the pole pieces of the magnet and having a contracted neck portion passing through the opening of the armature, the width of the armature stop beyond the contracted neck portion being greater than the width of the opening to limit the movement of the armature.

10. In a regulator, an electromagnet, a suitably mounted armature therefor having a T-shaped opening, and an armature stop secured to one of the pole pieces of the magnet and having a T-shaped end passing through the opening of the armature, the head of the armature stop being located in the narrower portion of the opening of the armature to engage the armature and limit its movements.

11. In a regulator, an electromagnet having a core with pole pieces secured thereto, a spacer surrounding the core and engaging one of the pole pieces, said pole piece having an end bent at an angle thereto, a base of insulating material fitting on the end of the core of the magnet against the spacer and having an opening to receive the bent end of the pole piece, and means for securing the magnet core to the base.

12. In a regulator, an electromagnet having a core with pole pieces secured thereto, a spacer surrounding the magnet core and engaging one of the pole pieces, said pole piece having an end bent at an angle thereto, a base of insulating material fitting on the magnet core against the spacer and having an opening to receive the bent end of the pole piece, the end of the magnet core being upset to rivet it to the base, and a screw threaded in the end of the magnet core forming a binding post therewith.

13. In a regulator, an electromagnet having a pole piece, a strip of flexible metal and a spring secured to the pole piece, and an armature secured to the strip of flexible metal, and having a tongue forming an adjustable hook engaging the spring for adjusting its spring action without disturbing its position.

14. In a regulator, an electromagnet having a pole piece, a strip of flexible metal and a spring secured to the pole piece, and an armature secured to the strip of flexible metal, and having a tongue cut therefrom and bent up to form an adjustable hook engaging the spring for adjusting its spring action without changing its other adjustments.

15. In a regulator, an electromagnet having a core with pole pieces secured thereto, a spacer surrounding the core and engaging one of the pole pieces, said pole piece having an end bent at an angle thereto, a base of insulating material fitting against the spacer and having an opening to receive the bent end of the pole piece, and means for securing the magnet core to the base.

16. In a regulator, an electromagnet having a core with a pole piece secured thereto, a spacer surrounding the core and engaging the pole piece, a projection on the pole piece, a base of insulating material fitting against the spacer and having an opening to receive the projection, and means for securing the magnet core to the base.

17. In a regulator, an electromagnet having a pole piece, a strip of flexible metal and a spring secured to the pole piece, and an armature secured to the strip of flexible metal and having a tongue cut therefrom and bent to form an adjustable projection engaging the spring for adjusting the spring action without changing the adjustment of the armature.

In testimony whereof I affix my signature in presence of two witnesses.

STEPHEN F. BRIGGS.

Witnesses:
KATHERINE HOLT,
R. S. C. CALDWELL.